INVENTORS
James M. Davis, Jr.
Robert E. Roy
BY W. M. Kan
ATTORNEY

United States Patent Office 3,297,917
Patented Jan. 10, 1967

3,297,917
CONTROL SYSTEM HAVING INFINITE IMPEDANCE AT A PRESELECTED OPERATING VOLTAGE
James M. Davis, Jr., Winston-Salem, N.C., and Robert E. Roy, Atlanta, Ga., assignors to Western Electric Company, Incorporated, New York, N.Y., a corporation of New York
Filed Jan. 10, 1964, Ser. No. 337,098
3 Claims. (Cl. 317—148.5)

This invention relates to a control system and more particularly to a control system for sensing a variable output voltage of a tested circuit and for operating a utilization circuit in response to a preselected level of variable output voltage.

When measuring the variable output voltage of a circuit to be tested, hereafter called "test circuit," it is often desired to operate a utilization circuit when a preselected level of output voltage of the tested circuit is reached. For example, in a meter relay circuit, a voltmeter has a movable contact which may be placed at any desired point on the meter's scale. The meter indicator needle is the second contact. The meter input terminals are connected across the output terminals of a tested circuit, and the meter contacts are connected to a utilization circuit, for example a relay. When the tested circuit output voltage reaches a preselected level, the meter contacts close to operate the utilization circuit.

When it is critical that the utilization circuit be operated exactly at a preselected level of output voltage of the tested circuit, the control system must have minimal effect on the measurement of the tested circuit. That is, the control system must present substantially an infinite impedance at the preselected level of output voltage of the tested circuit in order that it does not load the tested circuit.

As used throughout the remainder of the specification, the term "infinite impedance" is used to describe the condition which results when two potential sources of equal magnitude and polarity are applied across the same terminals such that neither potential source supplies or draws power from the other.

An object of this invention is to provide a new and improved control system.

Another object is to provide a new and improved control system for sensing a variable output voltage of a tested circuit and for operating a utilization circuit in response to a preselected level of the variable output voltage.

Another object is to provide a control system which has minimal effect on the measurement of a tested circuit.

Another object is to provide a control system which presents substantially an infinite impedance to a tested circuit at a preselected output voltage of the tested circuit.

Another object is to provide a control system which neither supplies power to nor draws power from a tested circuit at a preselected output voltage of the tested circuit.

With these and other objects in view, this invention contemplates a control system for sensing a variable output voltage of a tested circuit and for controlling a trigger circuit (which operates a utilization circuit) in response to a preselected level of variable output voltage, comprising an amplifier having input terminals for connection to the tested circuit and output terminals for connection to the trigger circuit. The amplifier has facilities which are adjustable to establish a preselected potential difference across its input terminals such that when the variable output voltage equals the preselected potential difference, the amplifier presents an infinite impedance to the tested circuit. The amplifier has additional facilities which are adjustable to control the output of the amplifier to preclude the operation of the trigger circuit until the variable voltage just exceeds the preselected potential difference.

The control system of this invention is capable of performing the function of a meter relay circuit with improved accuracy and may be constructed at a cost far below that of an accurate, conventional meter relay circuit.

Other objects and advantages of the invention will become apparent by references to the following detailed specification and accompanying drawings wherein.

*General description*

Figure 1:
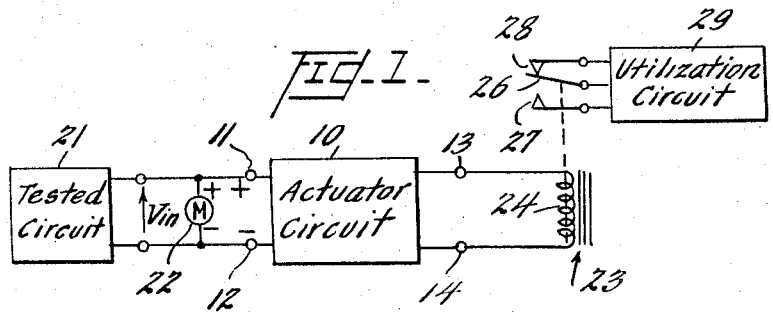
FIG. 1 is a block diagram of a control system incorporating certain features of the invention, and showing a tested circuit, an actuator circuit, and a utilization circuit.

In FIG. 1, an actuator circuit 10 has a positive input terminal 11, a negative input terminal 12, and output terminals 13 and 14. A tested circuit 21, which develops a variable output voltage generally designated $V_{in}$, and a measuring instrument 22 are connected across the input terminals 11 and 12.

Tested circuit 21 may be, for example, a temperature bridge having a variable voltage output indicative of temperature. However, tested circuit 21 may be any circuit or device having a variable voltage or current output. It is to be understood that any voltage or current points of the test circuit, and not necessarily the output, may be connected to input terminals 11 and 12.

For purposes of explanation, measuring instrument 22 will be considered to be, and hereafter referred to as, a millivoltmeter having a standard galvanometer movement incorporated therein. It is to be understood, however, that any instrument for measuring current or voltage may be used depending upon the manner in which it is connected to the output of tested circuit 21.

A relay 23 includes an operating coil 24 connected to output terminals 13 and 14, and an armature having a switch arm 26 connected thereto. Switch arm 26 transfers from contact 28 to contact 27 when a sufficient, predeterminable, current flows in coil 24, and thereby operates a utilization circuit 29.

Utilization circuit 29 may be any of a variety of circuits, for example a circuit for protecting millivoltmeter 22, a circuit for giving a visual or audible indication, or the like, when the variable output voltage of tested circuit 21 has attained a preselected level. It will be understood that relay 23 with its contact operation and utilization circuit 29 are merely illustrative of devices and circuits which may be connected to output terminals 13 and 14 of actuator circuit 10.

*Actuator circuit description*

Figure 2:
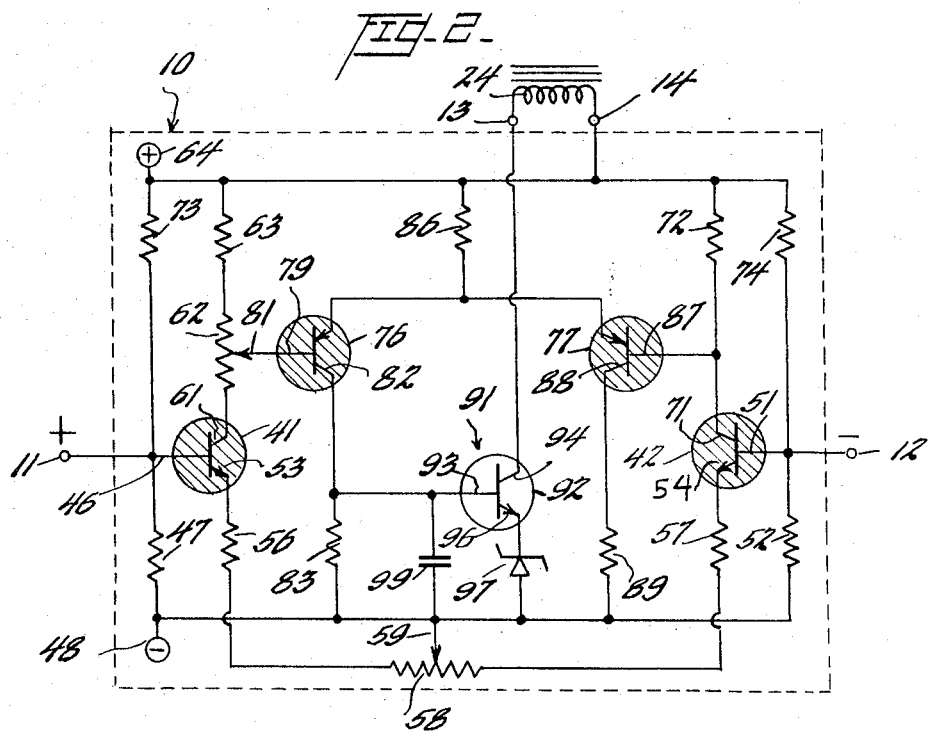
FIG. 2 is a detailed electrical schematic diagram of the actuator circuit of FIG. 1.

In FIG. 2, actuator circuit 10 includes first and second NPN transistors 41 and 42 connected as the first stage of a two stage differential amplifier. Transistor 41 has its base 46 connected to positive input terminal 11 and through a resistor 47 to a negative D.C. potential source 48. Transistor 42 has its base 51 connected to negative input terminal 12 and through a resistor 52 to potential source 48. A potentiometer 58 has one end of its resistance element connected through a resistor 56 to emitter 53 of transistor 41 and the other end of its resistance element connected through a resistor 57 to emitter 54 of transistor 42. Potentiometer 58 has an adjustable contact arm 59 connected to potential source 48.

Transistor 41 has its collector 61 connected through the resistance element of a potentiometer 62 and a resistor 63 to a positive D.C. potential source 64. Transistor 42 has its collector 71 connected through a resistor 72 to potential source 64. A pair of resistors, 73 and 74, are connected respectively between the bases of transistors 41 and 42 and potential source 64.

A pair of PNP transistors 76 and 77 are connected as the second stage of the differential amplifier. Transistor 76 has its base 79 connected through an adjustable contact arm 81 to the resistance element of potentiometer 62. Transistor 77 has its base 87 connected to collector 71 of transistor 42. The emitters of transistors 76 and 77 are connected in parallel through a common resistor 86 to potential source 64. Transistors 76 and 77 have collectors 82 and 88 connected in parallel through resistors 83 and 89 respectively to potential source 48.

A trigger circuit, generally designated by reference numeral 91, includes an NPN transistor 92 having its base 93 connected to collector 82 of transistor 76, its collector 94 connected to output terminal 13, and its emitter 96 connected through a Zener diode 97 to potential source 48. A capacitor 99 is connected across resistor 83. Output terminal 14 is connected to potential source 64.

*Control system operation*

In FIG. 2, transistors 41, 42, 76, and 77 are shown cross-hatched to indicate that these transistors are normally biased to the conductive state and remain conductive throughout the operation of actuator circuit 10. Transistor 92 is normally biased to the non-conductive state.

In FIGS. 1 and 2, with the positive and negative output contacts of millivoltmeter 22 connected to the positive and negative input terminals 11 and 12 respectively, contact arm 59 of potentiometer 58 is adjusted to establish a preselected potential difference between input terminals 11 and 12. Although a potential difference may exist between terminals 11 and 12 at any position of contact arm 59 (other than when the terminals are at equal potential), the contact arm is adjusted to make the potential at terminal 11 positive with respect to terminal 12. Millivoltmeter 22 may be removed from the circuit once the preselected potential difference has been established.

Since transistor 76 is always conductive, the output current flowing from its collector 82 establishes a voltage across resistor 83. Contact arm 81 of potentiometer 62 is adjusted to control the amount of current flow to collector 61 of transistor 41 from base 79 of transistor 76. Thus, the degree of conductivity of transistor 76 is controllable to regulate the amount of current flow from collector 82 through resistor 83. Zener diode 97 is connected in the non-conductive or reverse direction to maintain transistor 92 in its normal, non-conductive state. Contact arm 81 is adjusted until the current flow from collector 82 (and through resistor 83) is just below an amount of current which will develop a voltage across resistor 83 sufficient to exceed the breakdown voltage of Zener diode 97. Thus, trigger circuit 91 is held in readiness for sharp triggering into operation. Capacitor 99 is provided for by-passing any stray A.C. signals which may develop.

Tested circuit 21 is connected to actuator circuit 10 such that positive voltage of variable output voltage $V_{in}$ is connected to positive input terminal 11, and negative voltage is connected to negative input terminal 12. As $V_{in}$ approaches the preselected potential difference established across input terminals 11 and 12 by the adjustment of contact arm 59, actuator circuit 10 appears as a high impedance to tested circuit 21, and therefore has minimal effect on the tested circuit. When $V_{in}$ is exactly equal to the preselected potential difference, actuator circuit 10 appears as an infinite impedance to tested circuit 21 since there is no power delivered to or extracted from the tested circuit by the actuator circuit. At this point, actuator circuit 10 does not load tested circuit 21 and therefore has no effect upon the tested circuit.

When $V_{in}$ just exceeds the preselected potential difference, transistor 41 is rendered more conductive and more current flows to collector 61 from base 79 of transistor 76. Therefore, transistor 76 is rendered more conductive and more current flows from collector 82 to develop across resistor 83 a voltage sufficiently large to exceed the breakdown voltage of Zener diode 97, thereby sharply rendering transistor 92 conductive to trigger the trigger circuit 91 into operation.

This action completes a circuit from potential source 48, through the now conductive Zener diode 97, conductive transistor 92, relay coil 24, to potential source 64. Relay coil 24 is energized to operate its armature and move switch arm 26 to contact 27 to operate utilization circuit 29 (FIG. 1).

The adjustment of potentiometer 58 is wholly independent of the adjustment of potentiometer 62. Potentiometer 58 is adjustable to establish between input terminals 11 and 12 a preselected potential difference at which actuator circuit 10 appears as an infinite impedance to the tested circuit when the variable output voltage $V_{in}$ of tested circuit 21 exactly equals the preselected potional difference. On the other hand, potentiometer 62 is adjustable independently of potentiometer 58 to energize trigger circuit 91 at any preselected input voltage to actuator circuit 10. However, for optimum performance of actuator circuit 10, potentiometer 62 is adjusted such that trigger circuit 91 is energized at an input voltage to the actuator circuit just exceeding the potentional difference preselected by the proper adjustment of potentiometer 58.

It can thus be understood that the actuator circuit can be made very sensitive to a minute increase of input voltage to the actuator circuit above the preselected potential difference. In an actual embodiment using a Simpson milliammeter model number 29 having a 50 millivolt movement, actuator circuit 10 was connected to a tested circuit 21 capable of developing 50 millivolts output for coupling to input terminals 11 and 12. In such an embodiment, a sensitivity of plus or minus 1 millivolt from the preselected potential difference was realized. The circuit components used in this representative embodiment were the following:

| | |
|---|---|
| Transistors 41 and 42 | 2N1051 (Western Electric). |
| Transistors 76 and 77 | 2N1377 (Texas Instruments). |
| Transistor 92 | 2N560 (Western Electric). |
| Zener Diode 97 | 1N761 (Transitron). |
| Resistors 56 and 57 | 200 ohms. |
| Resistors 47, 52 and 72 | 100,000 ohms. |
| Resistors 73 and 74 | 1,500,000 ohms. |
| Resistor 63 | 33,000 ohms. |
| Resistors 86 and 89 | 1,000 ohms. |
| Resistor 83 | 8,200 ohms. |
| Potentiometer 58 | 1,000 ohms. |
| Potentiometer 62 | 25,000 ohms. |
| Capacitor 99 | 3 microfarads. |
| Relay 23 | 1,600 ohms, operating at 8 milliamps. |
| Potential source 64 | +22.5 volts D.C. |
| Potential source 48 | Negative terminal of potential source 64. |

It is to be understood that the above circuit component values are merely illustrative of circuit components which may be used in a particular application and are not to be construed as limiting the scope of the invention.

In a particular application, it may be desired to maintain relay 23 in a normally energized state instead of a normally de-energized state as described above. This can be accomplished in the following manner. Prior to coupling $V_{in}$ to input terminals 11 and 12, potentiometer 62 can be adjusted to develop sufficient current flow in resistor 83 to maintain transistor 92 in the conductive state, thereby maintaining relay 23 normally energized.

In this mode of operation, a reverse preselected potential difference is established between terminals 11 and 12 by adjustment of potentiometer 58; that is, potentiometer 58 is adjusted to make terminal 12 positive with respect to 11, prior to adjustment of potentiometer 62. Positive voltage is then applied to terminal 12 and a negative voltage is applied to terminal 11.

When the voltage applied to input terminal 11 and 12 equals the preselected potential difference, actuator circuit 10 appears as an infinite impedance to tested circuit 21 as previously described. When the voltage applied to input terminals 11 and 12 just exceeds the preselected potential difference, transistor 41 is rendered less conductive; therefore, transistor 76 is rendered less conductive and less current flows from collector 82 to resistor 83. This action reduces the voltage across resistor 83 to below the breakdown voltage of Zener diode 97 to sharply render transistor 92 non-conductive. In this manner, actuator circuit 10 is operative to de-energize relay 23.

It will be apparent to one skilled in this art that the transistors which are shown as NPN or PNP can be replaced by PNP or NPN transistors respectively, provided that appropriate biasing potential sources are provided. It will be further apparent that actuator circuit 10, which has been illustriously described as including a two stage differential amplifier, can be arranged to include more or less than two stages without effecting the essential operation of the actuator circuit and control system.

It is to be understood that the above-described control system is illustrative of the principles of the invention and other embodiments of the control system may be devised without departing from the scope of the invention.

What is claimed is:

1. In a control system for sensing a variable output voltage of a tested circuit and for energizing a trigger circuit in response to a preselected level of variable output voltage of the tested circuit,
   an amplifier circuit having input terminals for connection to a tested circuit and output terminals for connection to a trigger circuit, the amplifier comprising
      a first and a second transistor connected in a differential amplifier arrangement, each transistor having its base connected to an input terminal of the amplifier and arranged for connection to a suitable biasing potential source, each transistor also having its collector arranged for connection to the biasing potential source,
      a first potentiometer, connected between the emitters of the transistors and having its adjustable contact arranged for connection to the biasing potential source, for establishing a preselecting potential difference across the input terminals, and
      a second potentiometer, connected to the collector of the first transistor and arranged for connection to the biasing potential source, having its adjustable contact connected to the trigger circuit, for adjusting the amount of current to the first transistor to control a trigger circuit such that sufficient current flows to energize the trigger circuit upon the variable output voltage just exceeding the preselected potential difference.

2. In a control system for sensing a variable output voltage of a tested circuit and for operating a utilization circuit in response to a preselected level of variable output voltage of the tested circuit,
   an actuator circuit having input terminals for connection to a tested circuit and output terminals for connection to a utilization circuit, the actuator circuit comprising
      a normally de-energized trigger circuit connected to the output terminals for developing a voltage at the output terminals when energized,
      a first and a second transistor connected in a differential amplifier arrangement, each transistor having its base connected to an input terminal of the actuator circuit and arranged for connection to a suitable biasing potential source, each transistor having its collector connected to the biasing potential source,
      a first potentiometer, connected between the emitters of the transistors and having its adjustable contact arranged for connection to the biasing potential source, for establishing a preselected potential difference across the input terminals, and
      a second potentiometer, connected to the collector of the first transistor and arranged for connection to the biasing potential source, having its adjustable contact connected to the trigger circuit, for adjusting the amount of current to the first transistor to control the trigger circuit such that sufficient current flows to energize the trigger circuit upon the variable voltage just exceeding the preselected potential difference.

3. In a control system for sensing a variable output voltage of a tested circuit and for operating a utilization circuit in response to a preselected level of variable output voltage of the tested circuit,
   a relay actuator circuit comprising
      a normally de-energized relay for operating a utilization circuit upon energization of the relay,
      a trigger circuit for energizing the relay upon energization of the trigger circuit, and
      a differential amplifier including a biasing potential source; output terminals connected to the trigger circuit; a pair of input terminals for receiving the variable output voltage; at least first and second transistors, the base of each of the first and second transistors being connected to one of the input terminals and to the biasing potential source, the collector of each of the first and second transistors being connected to the biasing potential source; a first potentiometer having an adjustable contact connected to the biasing potential source and connected between the emitters of the first and second transistors for establishing a preselected potential difference across the input terminals; and a second potentiometer connected in the collector circuit of the first transistor and having an adjustable contact connected to the trigger circuit for adjusting the curent to the collector of the first transistor to control the energization of the trigger circuit upon the variable voltage just exceeding the preselected potential difference.

References Cited by the Examiner

UNITED STATES PATENTS

| | | | |
|---|---|---|---|
| 2,995,687 | 8/1961 | Mayberry | 317—148.5 |
| 3,161,045 | 12/1964 | Ames | 73—88.5 |
| 3,222,600 | 12/1965 | Gewirz | 324—123 |

OTHER REFERENCES

C. J. Kieffer: Electronics, May 4, 1962, pp. 44 and 45.

References Cited by the Applicant

UNITED STATES PATENTS

| | | |
|---|---|---|
| 3,024,388 | 3/1962 | Blitchington. |
| 3,077,566 | 2/1963 | Vosteen. |

MILTON O. HIRSHFIELD, *Primary Examiner.*

J. A. SILVERMAN, *Assistant Examiner.*